United States Patent [19]

Mizumura et al.

[11] Patent Number: 5,013,594
[45] Date of Patent: May 7, 1991

[54] OPTICAL INFORMATION RECORDING MEDIUM AND ITS PRODUCTION

[75] Inventors: Tetsuo Mizumura, Ibaraki; Minoru Ichijo, Toride; Ken-ichirou Nakao, Tsuchiura; Seiichi Matsushima, Tsukuba; Yoshitane Tuburaya, Toride, all of Japan

[73] Assignee: Hitachi Maxwell, Ltd., Ushitora, Japan

[21] Appl. No.: 248,126

[22] Filed: Sep. 22, 1988

[30] Foreign Application Priority Data

Sep. 25, 1987 [JP] Japan .................................. 62-238986

[51] Int. Cl.[5] .............................................. B32B 3/02
[52] U.S. Cl. ........................................ 428/64; 428/65;
428/412; 428/457; 428/421; 428/422; 428/913;
369/275.1; 369/284; 369/288; 346/76 L;
346/135.1
[58] Field of Search .................. 428/64, 65, 913, 412,
428/457, 421, 422; 369/275, 284, 288; 346/76
L, 135.1

[56] References Cited

U.S. PATENT DOCUMENTS

| 4,492,718 | 1/1985 | Mayer et al. | 427/160 |
| 4,522,846 | 6/1985 | Mayer et al. | 430/321 |
| 4,584,259 | 4/1986 | Mayer et al. | 430/273 |
| 4,592,939 | 6/1986 | Temple et al. | 428/64 |

FOREIGN PATENT DOCUMENTS

| 35-147392 | 8/1960 | Japan . |
| 63188837 | 1/1962 | Japan . |
| 3188837 | 8/1988 | Japan . |

Primary Examiner—Patrick Ryan

[57] ABSTRACT

There is disclosed an optical information recording medium comprising forming at least a recording or reflecting film on one surface of a substrate, wherein an plasma-polymerized film of a halogen-containing resin is formed on at least one of the surface of the substrate or the outer surface of the recording or reflecting film. The medium may further include an additional UV-curing film which is formed on any of the surface of the substrate or plasma-polymerized film of halogen-containing resin on the surface of the substrate, the recording or reflecting film, or the peripheries of the substrate and protective film.

10 Claims, 6 Drawing Sheets

OPTICAL INFORMATION RECORDING MEDIUM AND ITS PRODUCTION

BACKGROUND OF THE INVENTION

1. Field of the Invention

The present invention relates to an optical information recording medium and its production, and more particularly, to a means for protecting the recording film or reflecting film formed on the substrate and preventing these films from corrosion.

2. Discussion of Prior Art

In recent years, for recording media which are of high recording density and excellent in random access characteristics, optical information recording media represented, for example, by compact disks, video disks, optical disk memories for computer, etc. are rapidly being used.

Figure 7:
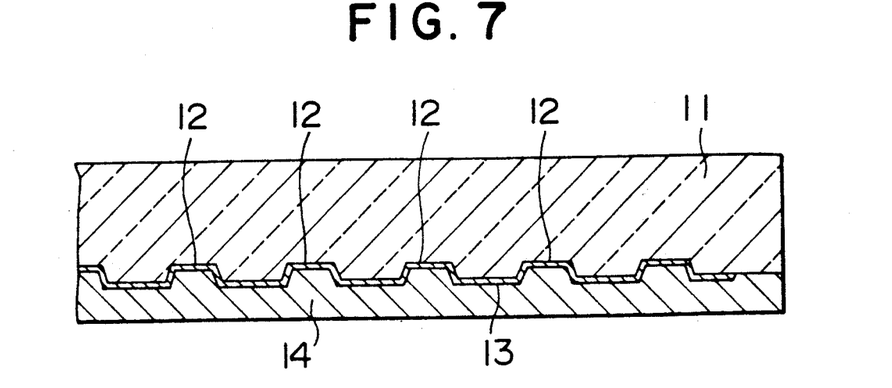
FIG. 7 is a sectional view illustrating the structure of a conventional optical information recording media.

FIG. 7 is a perspective sectional view of a conventionally known compact disk. On one side of a disk-form substrate 11 is spirally formed a row of pits 12 which modulate information signals into a mechanical uneven form. To the surface of this row of pits 12 is formed a reflecting film 13 made of a metal such as for example aluminum, and on this metallic reflecting film 13 is formed a protecting film 14 for protecting the reflecting film 13.

The foregoing substrate 11 is made of a polycarbonate resin because it should have a high permeability to light, a good moldability and a small optical strain. Further, UV-curing resins are preferably used to form the protecting film 14 because of their high mass-productivity.

The surface of the substrate to be irradiated with light beams is exposed to the atmosphere, so that it is often easy to scratch and dust easily adheres to it. Also, the surface of the substrate is sometimes stained for example with solvents, by mistake. When the surface to be irradiated with light beams is scratched, incident light beams are randomly reflected at the surface to effect the level fluctuation of regenerated information signals. Also, when dust or a solvent adheres to the surface, the amount of transmitted light beams is changed to effect the level fluctuation of regenerated information signals. Particularly, when solvents adhere to the surface, the plastic substrate dissolves and, as a result, the surface to be irradiated with light beams is damaged. When dust or solvents have adhered to the surface, it suffices to wipe them off, but because the plastic substrate is relatively soft, the surface to be irradiated with light beams is easily scratched and, because the surface is getting charged, dust adheres more easily.

Both polycarbonate resins constituting the substrate 11 and UV-curing resins constituting the protecting film 14 are a resin material which is relatively low in permeability to moisture.

However, compact disks are sometimes exposed to a high-temperature and high-humidity atmosphere for a long time, for example, as in the case where they are used in automobiles. In this case, the foregoing resin material absorbs a fair amount of moisture. As a result, there is a problem that moisture absorbed by the substrate 11 and protecting film 14 reacts with the metallic reflecting film 13 to form a hydroxide, whereby the reflectance of laser beams for regeneration decreases so as to worsen the S/N ratio of regenerated signals.

The above explanation was made with reference to compact disks, but there is also the same problem in the case of other optical information recording media having a substrate and a protecting film, both of which are made of resins. As to optical information recording media with a glass substrate, there is no problem of moisture permeating the substrate. However, if measures against the permeation of moisture into the protecting film are not taken, the same problem as above likewise occurs.

For the purpose of protecting the surface to be irradiated with light beams from being scratched and the adhesion of dust, it has already been proposed to form a protective film made of a solvent-type UV-curing resin on the surface (JP-A-63-188837). Even this measure is not seen to be sufficient in terms of the prevention of moisture permeation.

Also, from the standpoint of the prevention of moisture permeation, there is proposed a method of covering the substrate surface of optical information recording media with fluorine-containing resins by the application of plasma polymerization (JP-A-60-147392). This method, however, is not sufficient in terms of corrosion of the recording or reflecting film because the permeation of moisture from the side of the protecting film is not satisfactorily prevented. Complete prevention of moisture permeation is therefore impossible by this constitution.

SUMMARY OF THE INVENTION

The present invention was made to solve the problems inherent to the foregoing prior art, and its object is to provide an optical information recording medium which is protected from the corrosion of the recording or reflecting film, superior in scratch resistance of the surface to be irradiated with light beams and has a long life.

The present invention is characterized in that, in order to attain this object, a plasma-polymerized film of a halogen-containing resin (e.g. fluorocarbon resins) is formed on at least one of the surfaces of the substrate or the outer surface of the recording or reflecting film.

Also, it is characteristic of the manufacturing method of the present invention to include a step of placing a substrate, on which at least a recording or reflecting film has been formed, in the plasma gas atmosphere of a required monomer and forming the plasma-polymerized film of a halogen-containing resin on the desired surface. Also, the present invention includes forming a protective film comprising a solvent-type UV-curing resin on the surface to be irradiated with light beams.

DETAILED DESCRIPTION OF PREFERRED EMBODIMENTS

In the illustrated figures there is represented a substrate 1 or 11, a recording surface 1a, a surface to be irradiated 1b with light beams, a signal pattern 2 or 12, a recording or reflecting film 3 or 13, a protecting film 4 or 14 and a plasma-polymerized film 5 of a halogen-containing resin.

The halogen-containing resin used in the present invention can be produced from monomers listed below or the like, and this resin itself is a highly water-repellent substance. As examples of the monomers for halogen-containing resins which can be used for the production of the resins by means of plasma-polymerization, there are exemplified chloromethane, dichloromethane, chloroform, carbon tetrachloride, vinyl chloride, dichloroethylene, chloroethane, dichloroethane, trichloroethane, trichloroethylene, trichloropropane, allyl chloride, chlorobenzene, dichlorobenzene propylene chloride, allyl bromide, bromoethane, bromomethane, dibromomethane, dibromoethane, vinyl bromide, vinylidene bromide, benzyl bromide, methyl iodide, methylene iodide, propyl iodide, vinyliodide, bromochloroethane, heptafluoropropane, bromochloropropane, trifluoroiodoethane, dibromodichloroethane, dichlorodifluoromethane, fluoromethane, difluoromethane, tetrafluoromethane, fluoroethylene, tetrafluoroethylene, fluoroethane, difluoroethane, fluoroethanol, fluoropropane, difluoropropane, tetrafluoropropane, hexafluoroethane, fluorosilane, difluorosilane, trifluorosilane, tetrafluorosilane, fluorobenzene, fluorotoluene, fluoroiodobenzene, bromofluorobenzene and the like. Any mixture of these monomers and a mixture of any of these monomers with other organic substances, such as ethylene and the like, can be used. Furthermore, a mixture of fluorine, chlorine, bromine or iodine gas with a volatile organic substance such ethylene in vapor phase can also be used. Besides, when this resin is formed into a film by a plasma polymerization technique, the film formed, because of intermolecular crosslinking, becomes denser, more water-repellent, narrower in thickness and stronger in adhesiveness. Consequently, by forming this film on a desired portion of the media, it becomes possible to prevent the recording or reflecting film from corrosion owing to the permeation of moisture, and to prevent the recording and regeneration characteristics from deterioration.

First, the outline of the first embodiment of the optical information recording medium according to the present invention will be illustrated with reference to FIGS. 1 to 6. In these figures, substrate 1, a signal pattern 2, a recording or reflecting film 3, a protecting film 4 and the plasma-polymerized film of a halogen-containing resin.

The substrate 1 may be formed, for example, of transparent ceramics (e.g. glass) and transparent resin materials, in addition to polycarbonate resins, including polymethyl methacrylate resins, polymethylpentene resins, epoxy resins, etc. At one surface of the substrate 1 is formed, as need arises, a signal pattern 2, such as guide grooves corresponding to tracking signals, address signals, a row of pits corresponding to information signals, etc.

For forming the signal pattern 2, proper methods are applied depending upon the material of the substrate 1. For example, when the substrate 1 is formed with thermoplastic resins such as polycarbonate, polymethyl methacrylate, polymethylpentene, etc., the so-called injection method is suitable in which a molten material for the substrate is injected into a mold to integrally mold the substrate 1 and signal pattern 2. As to this kind of material for the substrate, there may be applied the known molding means, such as the so-called compression method or injection-compression method, in which pressure is applied after the molten material for the substrate has been injected into the mold for injection molding. When the substrate 1 is formed of ceramics (e.g. glass) or thermosetting resins (e.g. epoxy resins), the so-called 2P method (photosetting resin method) is suitable in which a photosetting resin is rolled and stretched between the substrate 1 and a stamper (mold) having the reversed pattern of a desired signal pattern to transfer the reversed pattern to the substrate 1. Further, as to the thermosetting resin, the so-called casting method may be applied in which a material for the substrate in a molten state is quietly poured into a mold to integrally mold the substrate 1 and signal pattern 2.

The recording film 3 is formed using optional materials for heat mode, well fit for the optical information recording medium. For example, writing-type optical information recording media are formed with low temperature-melting metallic recording materials (e.g. tellurium alloys) or organic color-type recording materials (e.g. cyanine or phthalocyanine series organic colors). Rewriting-type optical information recording media are formed with photomagnetic recording materials represented, for example, by non-crystalline alloys consisting mainly of tellurium, iron and cobalt, or phase change-type recording materials represented, for example, by non-crystalline alloys consisting mainly of indium and selenium.

In optical information recording media solely used for reading-out, a reflecting film is formed in place of a recording film. This reflecting film 3 can be formed with metals of high reflectance such as aluminum, chromium, silver, etc.

The foregoing recording film or reflecting film 3 can be formed by the use of the known thin-film formation methods such as for example sputtering, vacuum deposition, ion-plating, plasma polymerization, electroless plating, etc.

The foregoing protective film 4 is formed with UV-curing resins. In forming this protecting film 4, a method is used in which a UV-curing resin in a molten state is spin-coated onto the surface of the recording or reflecting film 3 and cured by applying UV rays having a required wavelength.

The plasma-polymerized film 5 of a halogen-containing resin is formed on at least one of either the surface of the substrate 1 or the outer surface of the recording or reflecting film 3.

Figure 1:
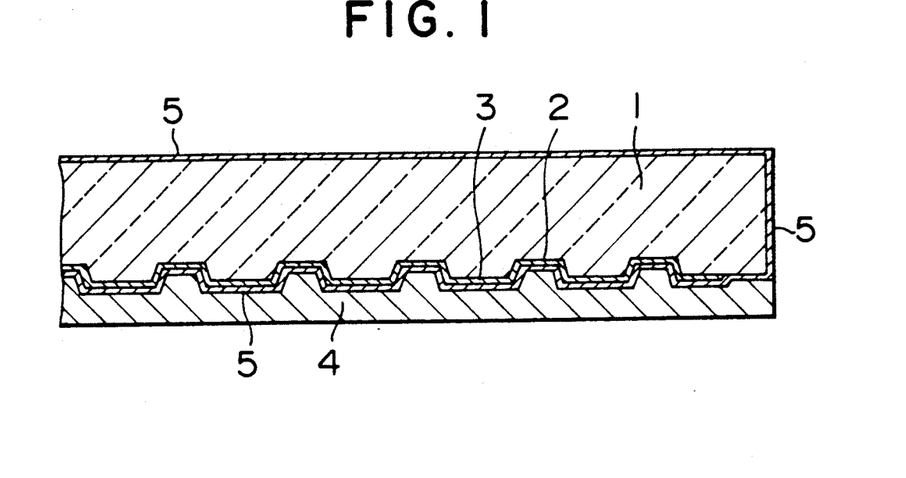
FIGS. 1 to 6 are sectional views illustrating the examples of the present invention.
Figure 2:
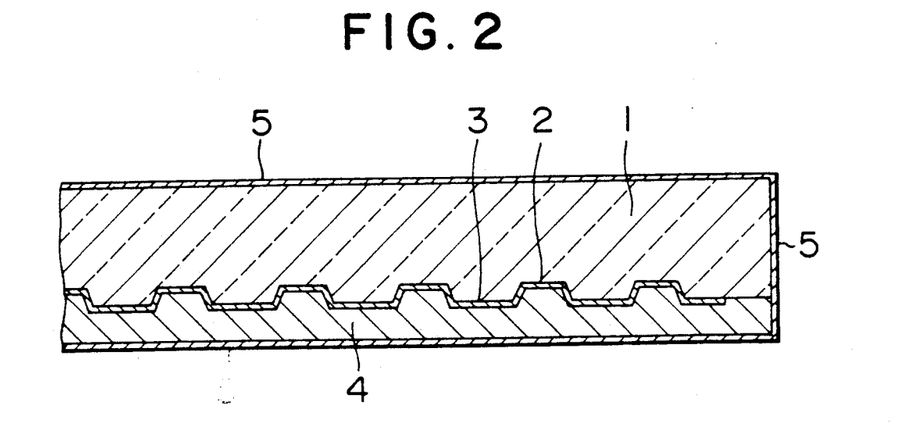

For example, as shown in FIG. 1, the plasma-polymerized film 5 of a halogen-containing resin is formed on both the surface and periphery of the substrate 1 and between the recording or reflecting film 3 and the protective film 4. Also, as shown in FIG. 2, the plasma-polymerized film 5 may be formed on all of the surface of the substrate 1, that of the protective film 4 and the periphery of these substrate 1 and protecting. film 4. In this case, since the recording or reflecting film 3 is completely covered with the plasma-polymerized film 5, the film 3 is not attacked by moisture in the air, so that the anti-corrosive property is greatly improved.

Figure 3:
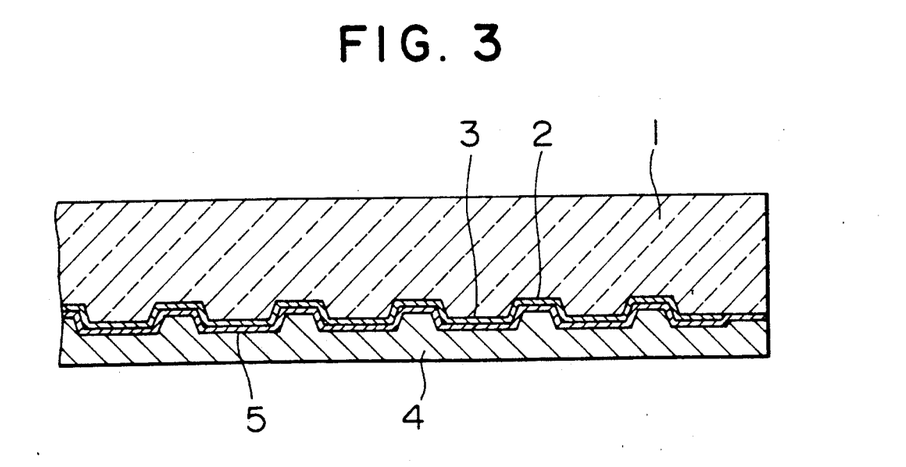
Figure 4:
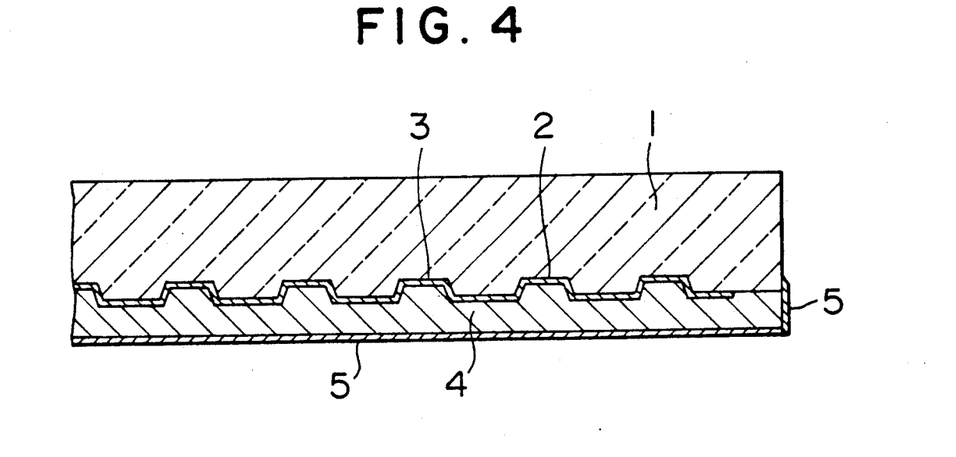

Also, as shown in FIG. 3, the plasma-polymerized film 5 may be formed only between the recording or reflecting film 3 and the protecting film 4. Also, as shown in FIG. 4, the plasma-polymerized film 5 may be formed only on the surface and periphery of the protecting film 4. When the substrate 1 is formed with materials impermeable to moisture, such as glass, etc., a sufficient moisture-preventing effect is obtained.

Figure 5:
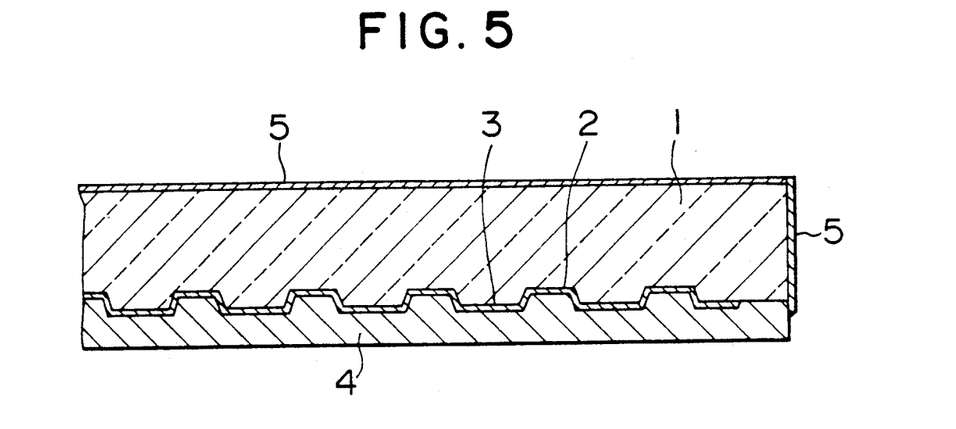

Further, as shown in FIG. 5, the plasma-polymerized film 5 may be formed only on the surface and periphery of the substrate 1. In this case, the permeation of moisture from the substrate 1 is prevented, and the deterioration of the recording or reflecting film 3 by the permeation of moisture is reduced by half.

Figure 6:
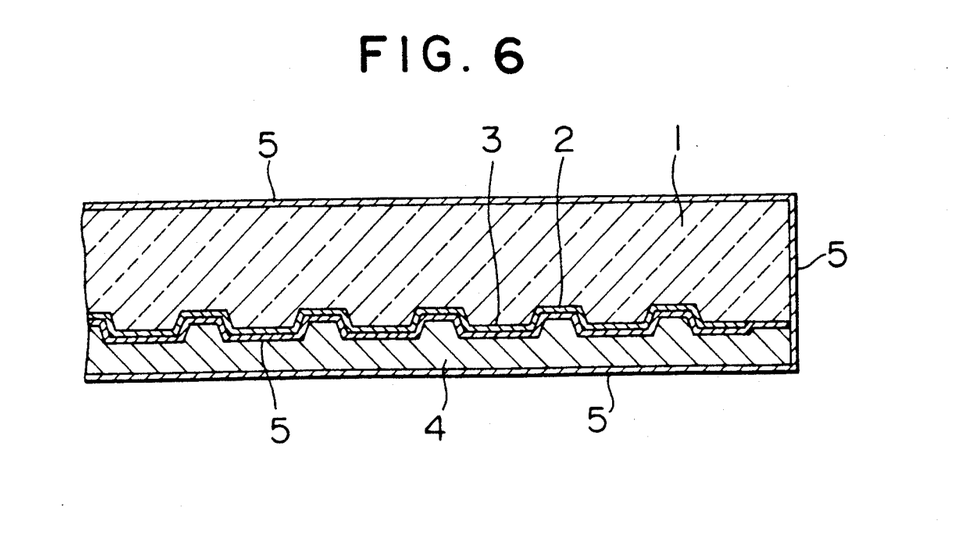

In addition, as shown in FIG. 6, the plasma-polymerized film 5 may be formed on all of the followings: between the recording or reflecting film 3 and the protecting film 4, the surface of the substrate 1, the surface of the protecting film 4 and the periphery of the substrate 1 and protecting film 4. By this means, protection of the recording or reflecting film 3 can be doubled, and deterioration of the film 3 by the permeation of moisture can be prevented more effectively.

As to the plasma-polymerized film 5 of a halogen-containing resin, the plasma-polymerized film of fluorocarbon resins, such as those obtained from tetrafluoroethylene, etc. are particularly preferred because of its good water-repellent property.

PREFERRED EMBODIMENTS RELATING TO FIGS. 1–6

Next, specific examples of the present invention will be shown, and reference will be made to the effect of the present invention with reference to the comparison of these examples with comparative examples wherein the plasma-polymerized film of a halogen-containing resin is not formed.

EXAMPLE 1

A polycarbonate substrate was put in a vacuum deposition chamber in which aluminum was placed and the pressure was adjusted to $1 \times 10^{-6}$ Torr. The aluminum was heated and vaporized while introducing oxygen into the chamber at a rate of 50 ml per minute to vacuum-deposit an aluminum reflecting film of about 1,000 Å in thickness onto one surface of the substrate.

This substrate on which the aluminum reflecting film had been formed in this way was put in a plasma-applying room in which the pressure was previously adjusted to $1 \times 10^{-6}$ Torr. A plasma gas was generated by applying an RF high-frequency power of 300 Watts to the electrodes while introducing a tetrafluoroethylene monomer gas at a rate of 10 ml per minute. Thus, the plasma-polymerized film of fluorocarbon of about 500 Å in thickness was formed on the entire surface of both the substrate and the aluminum reflecting film.

EXAMPLE 2

In the same manner as in Example 1, an aluminum reflecting film of about 1,000 Å in thickness was vacuum-deposited onto one surface of the polycarbonate substrate. After taking out the polycarbonate substrate from the chamber, a UV-curing resin was spin-coated onto the surface of the aluminum reflecting film and irradiated with UV rays of a required wavelength to form a protecting film of about 10 μm in thickness.

Thereafter, this substrate on which the protecting film had been formed was put in a plasma-applying room, and argon plasma was generated by introducing an argon gas into the room at a rate of 10 ml per minute to cleanse the surface of both the substrate and the protecting film.

After exhausting the argon gas, under the same conditions as in Example 1, the plasma-polymerized film of fluorocarbon of about 200 Å in thickness was formed on the entire surface of both the substrate and the protecting film.

EXAMPLE 3

Under the same conditions as in Example 1, an aluminum reflecting film of about 1,000 Å in thickness was vacuum-deposited onto one surface of the polycarbonate substrate, and then the plasma-polymerized film of fluorocarbon of about 200 Å in thickness was formed on the entire surface of both the substrate and the aluminum reflecting film.

Thereafter, this substrate was taken out of the plasma-applying room, and under the same conditions as in Example 2, the protecting film of a UV-curing resin having a thickness of about 10 μm was formed on the plasma-polymerized film of fluorocarbon formed on the aluminum reflecting film.

COMPARATIVE EXAMPLE 1

Under the same conditions as in Example 1, an aluminum reflecting film of about 1,000 Å in thickness was vaccum-deposited onto one surface of the polycarbonate substrate.

COMPARATIVE EXAMPLE 2

Under the same conditions as in Example 1, an aluminum reflecting film of about 1,000 Å in thickness was vacuum-deposited onto one surface of the polycarbonate substrate. Thereafter, under the same conditions as in Example 2, the protecting film of a UV-curing resin having a thickness of about 10 μm was formed on the surface of the aluminum reflecting film.

The following table shows the results of anti-corrosion test on the optical information recording media obtained in the foregoing Examples and Comparative examples. The test conditions were as follows: Atmospheric temperature, 60° C.; relative humidity, 90%; and test time, 2,000 hours. In the table, the percentage of reduction in the reflectance is shown by the ratio of the reflectance, $\eta_1$, of light before test to that, $\eta_2$, of light after test ($\eta_2/\eta_1$), and the contact angle $\theta$ is one between the surface of the sample and a waterdrop dropped down thereto.

TABLE 1

|  | Percentage of reduction in the reflectance at the side of substrate | Contact angle at the side of substrate | Percentage of reduction in the reflectance at the side of protecting film | Contact angle at the side of protecting film |
|---|---|---|---|---|
| Example 1 | 3% or less in 2000 hours | 123° | 10% in 2000 hours | 120° |
| Example 2 | 3% or less in 2000 hours | 122° | 3% or less in 2000 hours | 120° |
| Example 3 | 3% or less in 2000 hours | 121° | 3% or less in 2000 hours | 100° |
| Comparative example 1 | 50% or more in 500 hours | 102° | 50% or more in 200 hours | 95° |
| Comparative example 2 | 50% or more in 500 hours | 98° | 75% in 500 hours | 97° |

As is apparent from the above table, the optical information recording media obtained in the Examples are greatly improved in both the percentage of reduction in the reflectance and the contact angle as compared with the optical information recording media in which the plasma-polymerized film of a halogen-containing resin (fluorocarbon) is not formed. Also, no remarkable difference is observed between Examples, and there is obtained almost the same effect if the plasma-polymerized film of a halogen-containing resin (fluorocarbon) is applied to any surface.

PREFERRED EMBODIMENTS RELATING TO FIGS. 8-17

Figure 8:
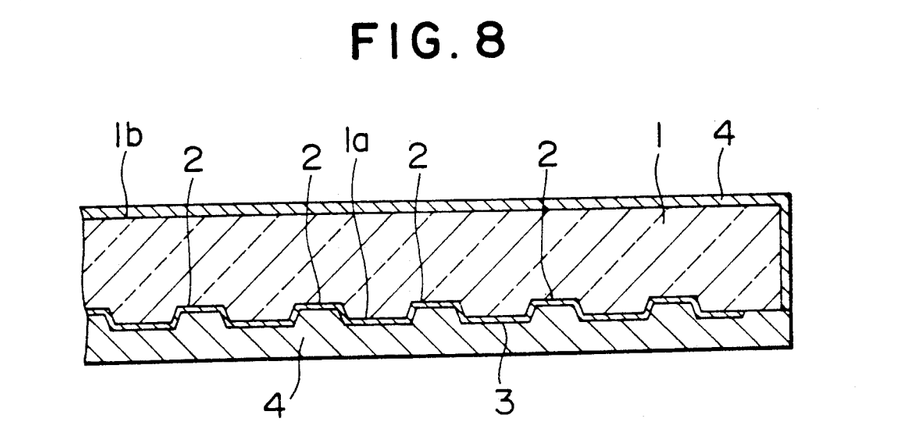
FIGS. 8 to 17 are further sectional views illustrating the examples of the present invention.
Figure 9:
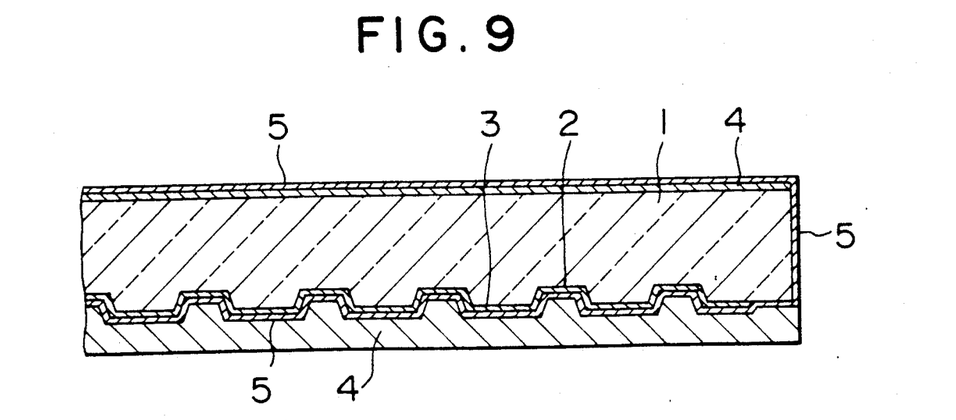
Figure 10:
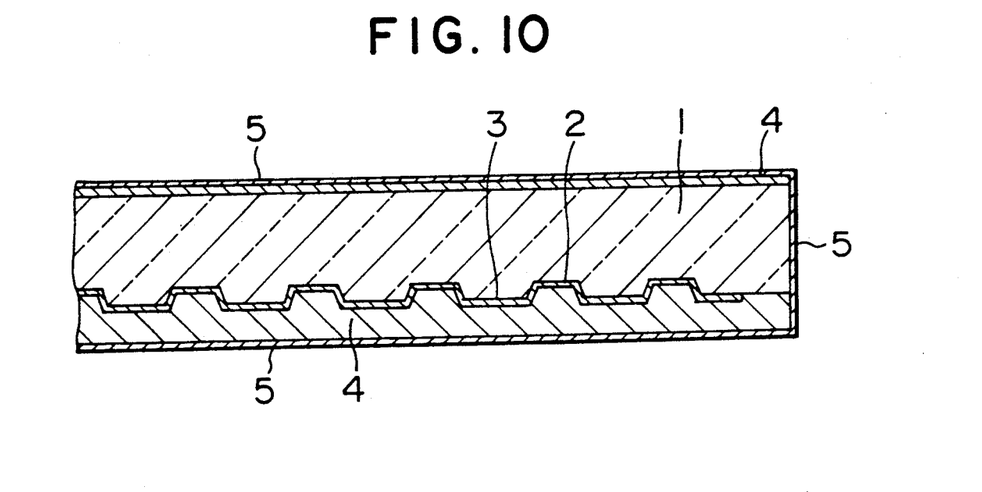
Figure 11:
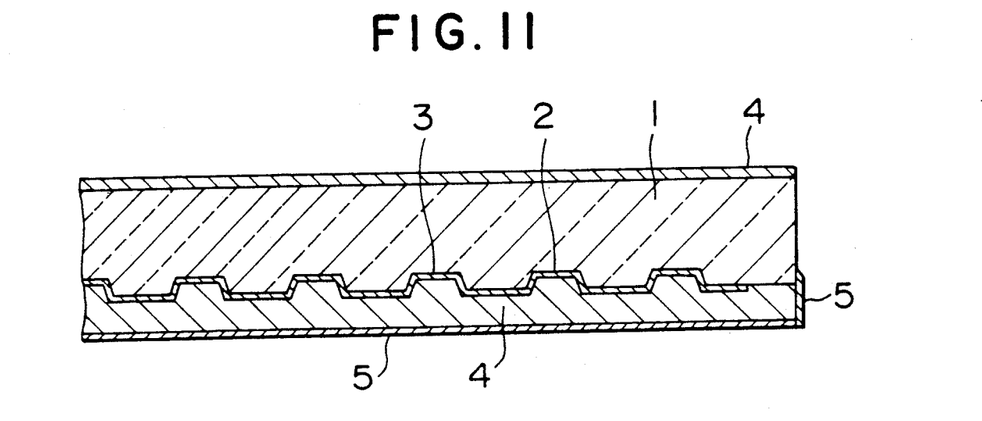
Figure 12:
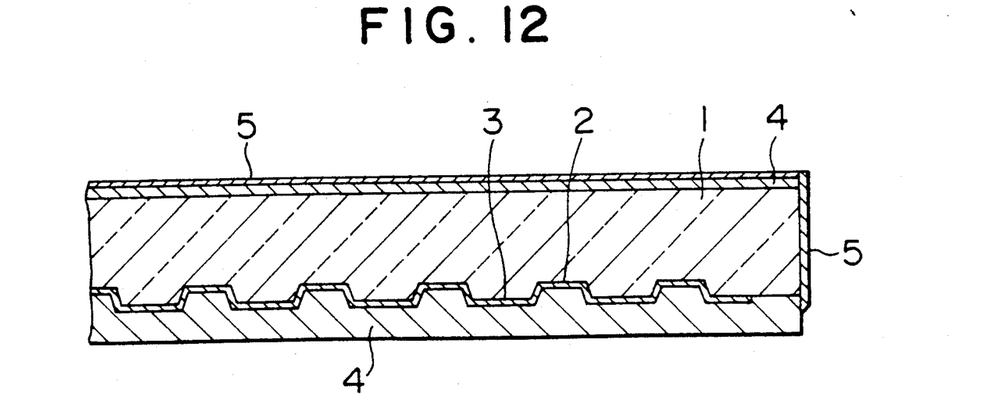
Figure 13:
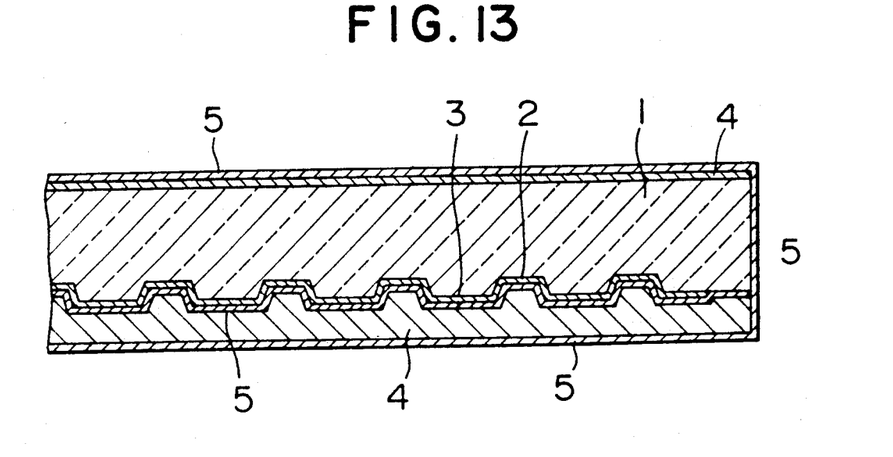
Figure 14:
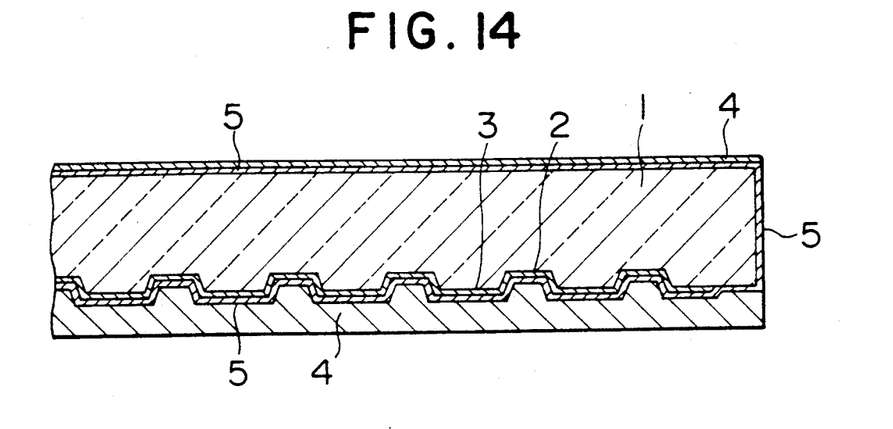
Figure 15:
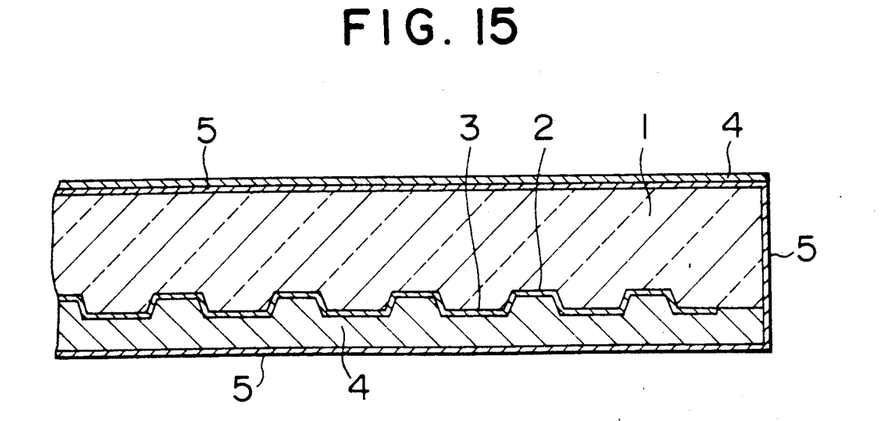
Figure 16:
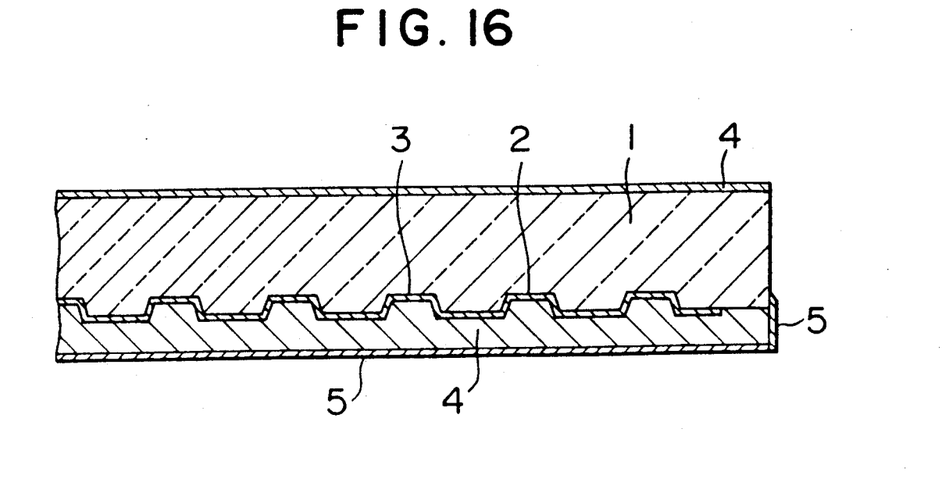
Figure 17:
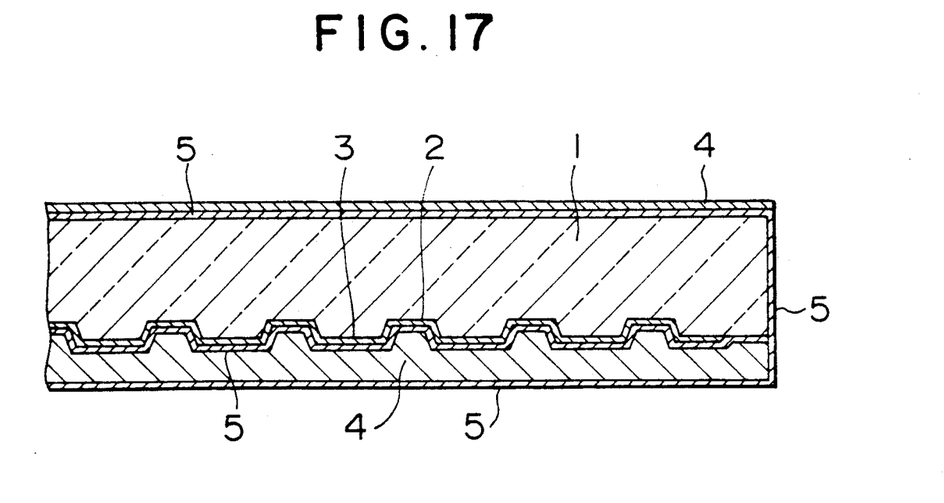

Examples of another embodiment of the present invention comprising additionally applying a UV-curing resin film will be illustrated with reference to the following drawings. FIG. 8 is a sectional view illustrating one example of the optical disk according to the present invention. In FIG. 8, a plastic substrate 1, a recording surface 1a, a surface to be irradiated with light beams 1b, a recording or reflecting film 3 and a protecting film 4 are shown.

In the same figure, the plastic substrate 1 is made of for example thermoplastic resins such as polycarbonate resins, polymethyl methacrylate resins, etc. or thermosetting resins such as epoxy resins, etc. Surface 1a of the substrate is a recording surface in which a spiral or concentric track comprising a row of pits has been formed. A recording layer 3 has been applied to this recording surface 1a.

Surface 1b of the plastic substrate 1 is a surface to be irradiated with light beams, and to surface 1b has been applied a protective film 4. This protecting film 4 is made of a solvent-type UV-curing resin, and it has a high hardness and an excellent antistatic effect, as compared with the plastic substrate 1. Because of these features, the surface 1b to be irradiated with light beams has improved scratch resistance, avoids adhesion of dust owing to electrification and undergoes no corrosion by solvents.

As examples of the commercially available solvent-type UV-curing resin, there are mentioned UVX-HM.185-2 (mfd. by Three Bond), MIT-2 (TOYO BOSEKI), H05123UN (FUJIKURA KASEI) and the like. Indeed, any equivalent to those listed can be used in the present invention. As described above, this solvent-type UV-curing resin is superior in mechanical strength, but when it is used as a protecting film 4, it should have the following properties: the percentage of shrinkage during the curing process by irradiation with UV rays should be small (about 15% or less); adhesion of the formed film to the plastic substrate 1 should be good; the refractive index and the coefficient of thermal expansion should be of the same degree as those of the plastic substrate 1; and it should not undergo the erosion by solvents. For the solvent-type UV-curing resin satisfying these conditions, there is used a solution obtained by dissolving a material for the protecting film in one of solvents (e.g. toluene, acetone, methyl ethyl ketone, methyl alcohol, ethyl alcohol, propyl alcohol) or a mixture of two or more of them. Since, however, the suitable solvent varies with a material for the plastic substrate 1, it should be selected properly. One specific example will be shown below: If the plastic substrate 1 is made of a polycarbonate resin, the solvent-type UV-curing resin satisfying the foregoing conditions when used as the protecting film 4 is UVX-UM-185-2 manufactured by Three Bond Co., Ltd.

Next, an explanation will be given to a method for forming the protective film and the performance of its protection of optical disks in which this solvent-type UV-curing resin has been used as the protecting film 4 as well.

First, referring to a method for forming the protecting film, a solvent-type UV-curing resin (the foregoing UVX-HM.185-2) is spin-coated to a thickness of from 3 to 5 $\mu$m onto the surface to be irradiated with light beams of the plastic substrate made of a polycarbonate resin, pre-dried for 1 minute in a 80° C. atmosphere to remove the solvent and then irradiated with UV rays of 150 mW/cm$^2$ for 10 seconds to cure the solvent-type UV-curing resin. Thus, the protecting film is obtained.

The mechanical scratch resistance of the protecting film thus obtained was tested by rubbing the surface of this film 5000 times with steel wool (#0000) under a load of 200 g. However, the surface was not scratched at all. It is found by this test that the protecting film has sufficiently a high abrasion resistance.

EXAMPLE 4

Even if the protecting film made of a solvent-type UV-curing resin is formed, an effect to lower the absorption of moisture from the atmosphere is not obtained. This effect can be improved by combining the protecting film made of a solvent-type UV-curing resin with the plasma-polymerized film of a halogen-containing resin.

FIGS. 9, 10, 11, 12 and 13 are views illustrating examples in which the protecting film made of a solvent-type UV-curing resin is first formed on the surface to be irradiated with light beams of the transparent resin substrate and then the plasma-polymerized film of a halogen-containing resin is formed, using the same method and material, as used in Examples shown by FIGS. 1, 2, 4, 5 and 6.

By using the protecting film in such a combination, there can be obtained at least the effects of preventing the transparent substrate from absorbing moisture from the atmosphere as well as from adhering dust, etc.

EXAMPLE 5

In order to obtain an additional effect to prevent the foregoing transparent substrate surface from suffering minute scratches, the effective constitution of the protecting film of the transparent substrate is to arrange the protecting film made of a solvent-type UV-curing resin at the outermost side and the plasma-polymerized film of a halogen-containing resin in the inner side of the former film.

FIGS. 14, 15, 16 and 17 are views illustrating examples of optical disks comprising arranging an additional protecting film made of a solvent-type UV-curing resin at the surface to be irradiated with light beams of the transparent substrate of the optical disks which are shown in FIGS. 1, 2, 4 and 6, respectively, and on which the plasma-polymerized film of a halogen-containing resin has been formed as the protecting film.

The characteristics of the present invention, as shown by the foregoing examples, are as follows: An effect to inhibit the absorption of moisture from the atmosphere is not only obtained by forming the plasma-polymerized film of a halogen-containing resin, but also an effect to enhance the resistance to external scratch of the transparent substrate of the optical disks is obtained by forming a hard protecting film of a solvent-type UV-curing resin on the outer surface.

The gist of the present invention consists in that the plasma-polymerized film of a halogen-containing film is formed on the desired surface of optical information recording media which comprise a recording or reflecting film to one side of the substrate. Consequently, the shape and structure of the substrate, the presence or absence of signal patterns, the film thickness of the recording, reflecting and protecting films, the quality of materials for these films, the presence or absence of the protecting film, etc. are not limited to those described in the foregoing examples.

For example, in the foregoing examples, explanation was given to the single plate of optical information recording media. However, the gist of the present invention is not limited to this single plate, it being also possible to prepare bi-recording layer-type optical information recording media by sticking two single plates together. In this case, all the types of optical information recording medium can be prepared by sticking the single plates together so as to contact directly or to take an air-sandwich structure. As to the bi-recording layer-type optical information recording media, it is also possible after the sticking to form the plasma-polymerized film of a halogen-containing resin on the outer surface of the substrate.

Also, the kind of optical information recording media to which the present invention can be applied is not limited to the disk-form optical information recording media, it being also possible to apply the present invention to card-form ones and tape-form ones.

As explained above, the optical information recording medium of the present invention has the plasma-polymerized film of a halogen-containing resin formed on the desired surface. Consequently, permeation of moisture from the substrate or protecting film is prevented, there being no erosion of the recording or reflecting film by moisture. Thus, the present invention can provide optical information recording media having excellent corrosion resistance and a long life.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An optical device comprising:
   a substrate having an outer main surface and outer side surface,
   a recording or reflecting film on an inner main surface of said substrate,
   a protective film having an outer main surface and outer side surface provided on said recording or reflecting film, and
   a plasma-polymerized film of a halogen-containing resin provided at least at a periphery of said device so as to completely cover said outer side surfaces of said substrate and said protective film, at said periphery of said recording or reflecting film where said substrate and protective film come together thereby completely sealing said recording or reflecting film between said substrate and protective film to prevent any effect from the atmospheric elements, such as moisture.

2. An optical device according to claim 1, wherein said plasma-polymerized film of halogen-containing resin is provided on both the outer main surface and outer side surface of said substrate and on a main surface of said recording or reflecting film, said plasma-polymerized film being connected at the peripheries of said substrate and said recording or reflection film and said protective film is provided on said plasma-polymerized film.

3. An optical device according to claim 1, wherein said plasma-polymerized film of halogen-containing resin is provided on said outer main surface and outer side surface of said protective film, and said outer main and outer side surfaces of said substrate at the peripheries of said protective film and substrate.

4. An optical device according to claim 1, wherein said plasma-polymerized film of a halogen-containing resin is a fluorocarbon resin.

5. An optical device according to claim 1, wherein said substrate comprises a polycarbonate resin.

6. An optical device according to claim 1, wherein said protective film comprises a UV-curing resin.

7. An optical device according to claim 1, which comprises an additional UV-curing resin film on at least one of either said outer main surface and periphery or outer side surface of said substrate.

8. An optical device according to claim 2, wherein said plasma-polymerized film of halogen-containing resin completely encapsulates said substrate and said recording film or said reflecting film in a continuous manner.

9. An optical device according to claim 1, wherein said plasma-polymerized film of halogen-containing resin completely encapsulates said substrate, recording film or said reflecting film and said protective film in a continuous manner.

10. An optical device according to claim 1, wherein said plasma-polymerized film of halogen-containing resin encapsulates substantially said recording film or said reflecting film and said protective film in a continuous manner.

* * * * *